T. F. FITZSIMMONS.
GAS PRODUCER.
APPLICATION FILED NOV. 30, 1908.

1,016,133.

Patented Jan. 30, 1912.

3 SHEETS—SHEET 1.

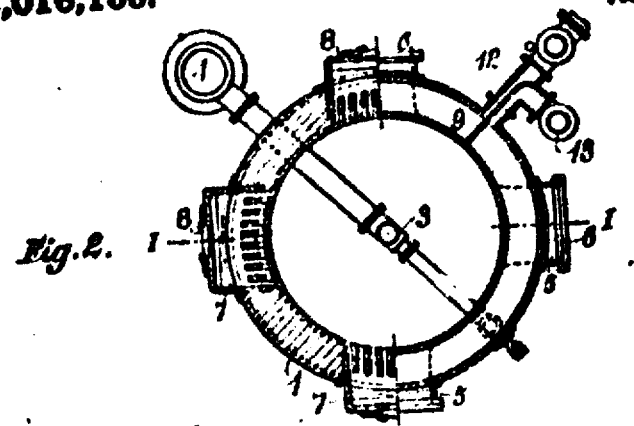
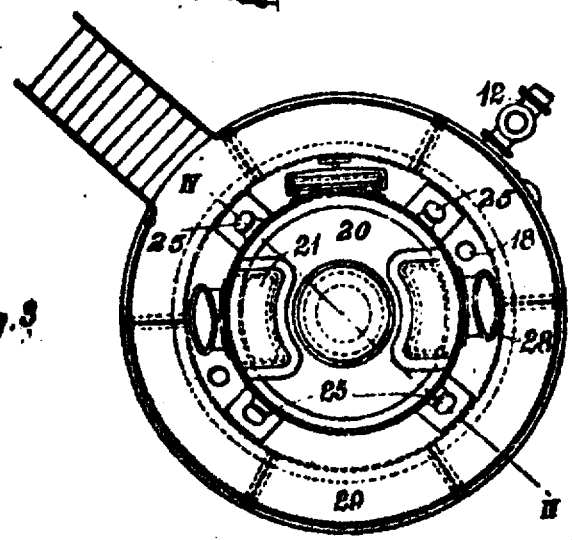

T. F. FITZSIMMONS.
GAS PRODUCER.
APPLICATION FILED NOV. 30, 1908.

1,016,133.

Patented Jan. 30, 1912.

3 SHEETS—SHEET 3.

Witnesses:
W. A. Williams
M. A. Work

Thomas F. Fitzsimmons Inventor
By his Attorneys
Mauro, Cameron, Lewis & Massie

UNITED STATES PATENT OFFICE.

THOMAS F. FITZSIMMONS, OF BROOKLYN, NEW YORK.

GAS-PRODUCER.

1,016,133. Specification of Letters Patent. Patented Jan. 30, 1912.

Application filed November 30, 1908. Serial No. 465,193.

*To all whom it may concern:*

Be it known that I, THOMAS F. FITZSIMMONS, a citizen of the United States of America, and a resident of Brooklyn, New York, have invented a new and useful Gas-Producer, which is fully set forth in the following specification.

This invention relates to the production of a clean, properly-fixed gas from anthracite coal, or from coke or charcoal, particularly for use in gas engines.

The producer herein set forth, on account of its compact construction and self-contained nature, is especially adapted as a marine gas-producer.

Among the chief features of the invention are, that the crown of the generator constitutes the floor of the wet scrubber, so that the water in the latter keeps this crown cool; that the take-off leading from the generator to the scrubber is located centrally of the generator and extends downward to a point considerably removed from the crown of the generator, whereby the high incandescence is confined to the central portion of the fuel and kept away from the structure itself; that no grate-bars are employed, but the incandescent fuel rests upon a bed of ashes that is supported upon a central mound, whereby excess of ashes may be discharged through suitable ash doors; the provision of substantially vertical baffles, for admitting air around the bottom of the incandescent fuel, the same serving also for inspection of the incandescent mass; the provision of a suitably located pre-heater and of a suitably constructed saturator of novel construction, both located within the wall of the generator; novel fuel-feeding devices, and the arrangement thereof upon the crown of the generator and within the outline of the superimposed scrubber; provision for introducing air at the center of the bottom of the incandescent fuel, or around the periphery thereof, at will; means for creating draft by suction or by pressure or by both.

The invention consists of the employment of one or more or all of these features, and also other features of convenience and utility that will be hereinafter more particularly pointed out and claimed.

The invention will be best understood by reference to the annexed drawings that illustrate one embodiment thereof.

Figure 1:
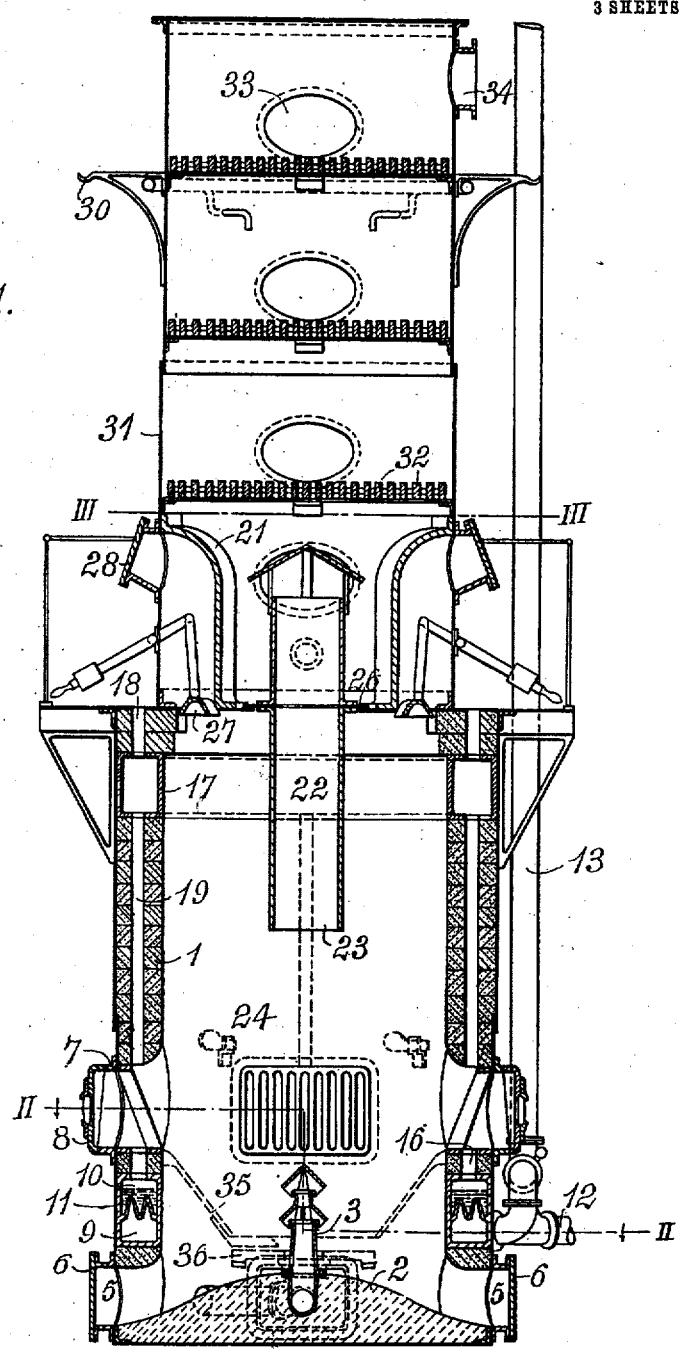
Figure 4:
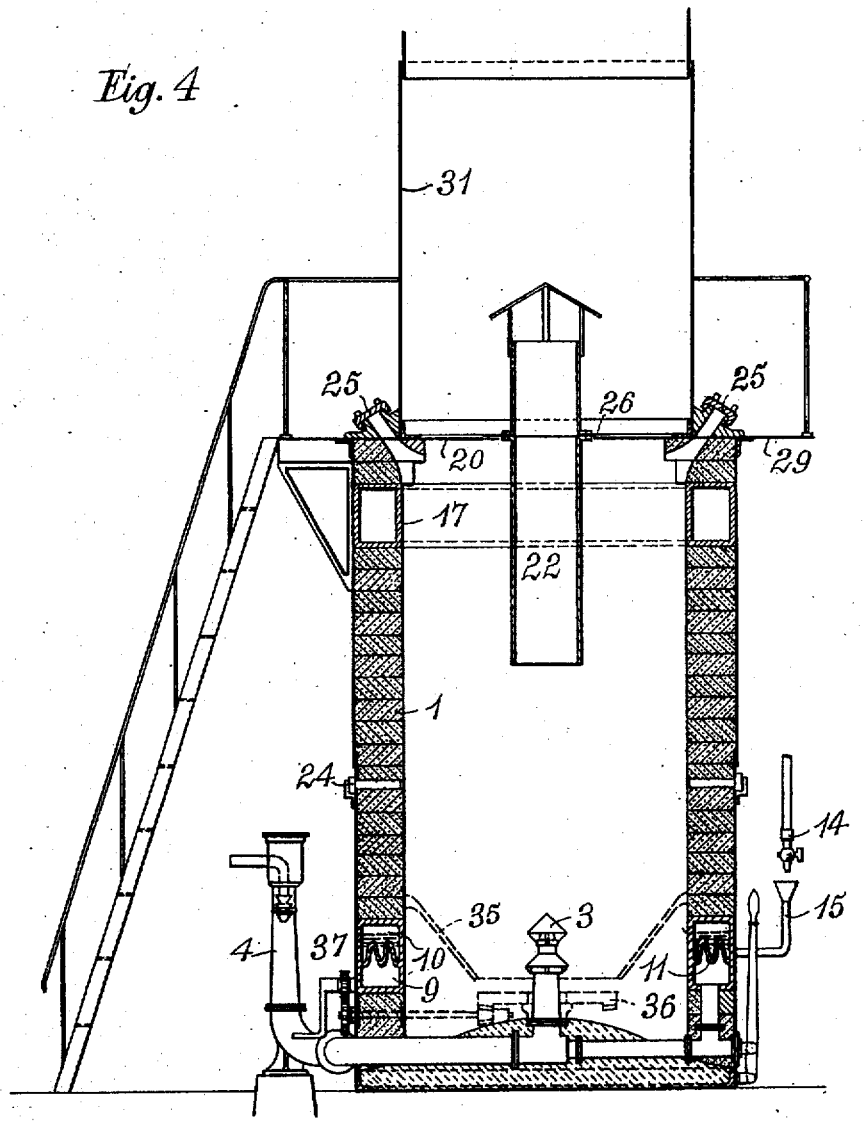

In these drawings Figure 1 is a vertical section through my improved producer, being taken through lines I—I of Fig. 2; Fig. 2 is a transverse section through line II—II of Fig. 1; Fig. 3 is a transverse section through line III—III of Fig. 1; and Fig. 4 is a vertical section through line IV—IV of Fig. 3.

The generator is shown as having the cylindrical wall 1 constructed of fire-brick or other refractory material, and preferably inclosed in a casing of sheet steel. In the bottom of the generator is the mound 2, formed of broken fire-brick, united by cement; and from the center of this mound rises a twyer 3 leading from the (steam-actuated) jet-blower 4.

5—5 represent ash-openings provided with the doors 6.

The mound serves to receive a bed of ashes to constitute an ash-hearth, and as the ashes accumulate they can be drawn off through the ash-doors, the slope of the mound assisting in this. Located at or a little above the level of the top of the ash-hearth are openings in the wall 1, in which are located the removable baffles 7—7, consisting of substantially-vertical gratings whose inner faces are protected by refractory material, the whole being located within the wall of the generator; and 8—8 are air-tight closures, in which may be windows of heavy glass. Beneath these baffles, and within the wall 1 is located an annular space divided into two compartments 9 and 10, by the horizontal partition 11 of corrugated metal. The pipe 12 admits into the lower compartment 9 heated gases (such as the exhaust of gas-engines or other waste products), which, after passing around the entire annular space 9, escape through stack 13; water is admitted into the upper compartment 10, through the drip-cock 14 and funnel 15, which latter leads to the upper compartment 10. The exhaust gases from the gas-engine are frequently as hot as 1200° F.; and this intense heat, acting upon the water resting upon partition 11, converts the latter into steam, which passes through the ports 16 (in front of the baffles 7) and thence into the incandescent fuel.

In the upper part of the wall 1 of the generator, is the pre-heater 17, consisting of an annular compartment lying within the wall of the generator, and having a plurality of air-inlets 18 from the top of wall 1; a passage 19 leads downward and opens in front of each baffle, whereby air is admitted to the fuel in a pre-heated condition.

20 represents the crown of the generator, which is at the same time the floor of the wet scrubber. It is shown as resting upon the circular wall of the generator 1, as having cut-away portions for the feed-devices 21, and a central opening for receiving the take-off 22. This take-off 22 extends downwardly to about mid-way between the crown and the baffles, whereby the draft—and the region of high incandescence—will normally be defined by the cone whose base is outlined by the baffles 7, and whose apex is the bottom 23 of the take-off; and rising some distance above the floor of the scrubber, it acts as a dam to prevent water from the scrubber entering the generator. By reason of this arrangement the greater part of the generator is not subjected to the intense action of the fierce heat, and for the same reason, and on account of the fact that the crown 20 is water-cooled, the crown is similarly protected.

To start the operation, the mound 2 is covered with ashes or the like and the fuel introduced (as by removing one of the baffles 7) and fired as through the ash-openings 5; thereafter fresh fuel is introduced from time to time through feed-devices 21. As the fuel is burned, the amount of ashes gradually accumulates and is thereafter kept at about (or somewhat below) the level of the bottom of the baffles 7, the ash-openings 5 serving to withdraw ashes from time to time to prevent too great an accumulation. The ashes thus constitute a hearth for the incandescent fuel, whose incandescence is confined centrally by means of the location of the mouth 23 of the take-off 22.

Air may be admitted around the periphery only of the base of the fuel, either by opening the closures 8 of the baffles, or by opening the inlets 18 to the super-heater, or by utilizing both of these means; and all or only some of these inlets may be relied on, and the closures may be opened entirely or only part way. Air is thus drawn in from around the periphery, preferably an artificial draft by the suction of a fan or other similar exhaust being relied on. In place of a fan, the in-take stroke of the gas-engine may be employed for the purpose.

Air may be admitted to the fuel at the center of its base only, by means of the jet-blower; in which case the covers of the baffles and of the super-heater inlets will be closed, to prevent the gases being forced out at these openings.

Finally, air may be admitted both around the periphery and also simultaneously at the center of the base of the incandescent fuel, by having the suction or exhaust greater than the pressure from the jet-blower. In this case one or more or all of the covers of the baffles and of the super-heater inlets will be opened more or less. The covers of the baffles and the pre-heater inlets may be closed and the jet-blower and exhaust so balanced as to create a steady, uniform draft from the center only of the bottom of the incandescent fuel. By these means the attendant can regulate the extent of the incandescence of the fuel. By the means described the producer can be operated either by suction alone or by pressure alone, or by both.

The fuel when of small size or of not the best quality is sometimes liable to cake together and form masses of clinker etc. To overcome this, steam will be admitted through the ports 16, by manipulating the drip-cock 14; and the steam from the jet-blower is effective for the same purpose. Although the steam from these two sources is primarily intended merely for disintegrating any masses of fuel that may have formed, yet it is evident that steam through these sources may be admitted in larger quantities if desired, to enrich the make of gas with hydrogen, thus producing a water-gas.

24—24 represent conveniently located peep-holes in the wall 1, that are covered by heavy glass; and 25—25 are poker-holes at the top of the generator, having suitable coverings.

The take-off 22 is shown as composed of two sections having flanges at their adjacent ends, which are bolted together to inclose a metal annulus 26, that rests upon the crown 20. The lower section of the take-off 22 will preferably be composed of or coated with refractory material, and the parts may be disassembled for inspection or cleaning.

21 represents a feed device, of which there are preferably two. This device comprises a hopper located within the outline of the cylindrical scrubber and having two closures, a drop-valve 27 and an upper cover 28. The fuel is raised to the platform 29, for dumping into the hopper, as by block and tackle upon the support 30.

The scrubber as a whole consists of the metal cylinder 31, having a plurality of the ordinary wooden gratings 32 covered with usual scrubbing materials.

33 represents a number of cleaning-doors.

34 is the take-off from the scrubber, leading to the fan or other exhaust and thence either to the gas-engine (or gas reservoir) or to a purge-stack (none of which are shown, since these parts are well understood).

At the top of the wet scrubber 31 are the ordinary water-sprays, as 38, for drenching the scrubbing material to assist in purifying the make of gas. This water accumulates upon the crown 20 to a depth of several inches or more; and a water-seal or other suitable means (not shown) is provided for the overflow. Below the baffles 7 I sometimes provide a frustro-conical ash-hopper indicated by dotted lines 35, beneath which may be provided the revoluble ash-table 36, operated from crank 37 with suitable gearing.

From the foregoing description it will be seen that my invention provides a compact, simple, self-contained apparatus which takes up comparatively little floor space; that it can be used with the greatest efficiency for making producer-gas for light, heat and power purposes, from anthracite, coke, charcoal, etc.; that there is no liability of the gas escaping through joints or leaks in the generator; that the work of the stoker in feeding and cleaning out ashes is reduced to the minimum; and that the attendant has absolute control over his fire and the place and manner of admitting air (or steam) thereto. In addition to the foregoing advantages, and others that will occur to persons skilled in the art, another great advantage is in the durability of this generator and plant, since the intense heat is kept from contact with the parts.

I have described my invention with some particularity, but only for the sake of clearness; since I do not limit my invention to the precise construction and arrangement disclosed or to the proportions indicated. Changes may be made in these, and parts of my invention used to the exclusion of other parts, without departing from the spirit of the invention.

Having thus fully set forth my invention, I claim:

1. In a self-contained vertically-arranged gas-plant, the combination with the generator, of a wet-scrubber superimposed thereon, and a common partition separating the two.

2. In a self-contained vertically-arranged gas-plant, the combination with the generator, of a wet-scrubber superimposed thereon, a common partition separating the two, and the centrally-located take-off carried by said partition and extending from near the middle of said generator and opening into said scrubber above said partition.

3. In a self-contained vertically-arranged gas-plant, the combination with the generator, the superimposed wet-scrubber, and the common partition separating the two, of a feed-device consisting of a compartment located within the contour of said scrubber and having at its bottom a drop valve in the plane of said partition and a closure at the top of said compartment.

4. In a self-contained vertically-arranged gas-plant, the combination with the generator and the wet-scrubber superimposed thereon, of a common partition separating the two and having a central opening and a cut-away portion, a take-off supported within said central opening and extending to about the middle of said generator, and a feed-device located within the contour of said scrubber and registering with said cut-away portion.

5. In a self-contained gas-plant, the combination with the generator, a superimposed wet-scrubber, a common partition separating the two, and a take-off supported by said partition and leading from the middle of the generator to the scrubber, of means for introducing air at the center of the bottom of the incandescent fuel or around the periphery thereof.

6. In a self-contained gas-plant, the combination with the generator, a superimposed wet-scrubber, a common partition separating the two, and a take-off supported by said partition and leading from the middle of the generator to the scrubber, of means for introducing steam at the center of the bottom of the incandescent fuel or around the periphery thereof.

7. In a self-contained gas-plant, the combination with the generator, a superimposed wet-scrubber, a common partition separating the two, and a take-off supported by said partition and leading from the middle of the generator to the scrubber, of means for introducing air at the center of the bottom of the incandescent fuel or around the periphery thereof, and means for introducing steam at the center of the bottom of the incandescent fuel or around the periphery thereof.

8. In a self-contained vertically-arranged gas-plant, the combination with the generator, a wet-scrubber superimposed thereon, and a common partition separating the two, of a take-off supported by said partition and leading from the middle of the generator, a pre-heater for air located within the wall of said generator, a saturator also located within the wall of the generator for providing steam, a fuel-feed located upon top of said generator and within the contour of the scrubber, means for admitting steam at the center of the incandescent fuel or around the periphery thereof, and means for admitting air around the periphery or at the center thereof.

9. In a self-contained vertically-arranged gas-plant, the combination of the generator and the wet-scrubber superimposed thereon to provide a water-cooled crown therefor, fuel-feeds inserted within the contour of said scrubber and resting on said generator, a take-off leading from the middle of said generator, means in the bottom of said generator for providing an ash-hearth, and means for creating a draft and confining the same and the zone of highest incandescence centrally away from the structure of the generator.

10. In a self-contained vertically-arranged gas-plant, the combination with the generator, the wet scrubber superimposed thereon, a common partition separating the two, and a take-off supported by said partition and leading from the middle of said generator, of means for operating the said generator under pressure alone or under suction alone or by both pressure and suction.

In testimony whereof I have signed this specification in the presence of two subscribing witnesses.

THOMAS F. FITZSIMMONS.

Witnesses:
C. A. L. MASSIE,
RALPH L. SCOTT.

Copies of this patent may be obtained for five cents each, by addressing the "Commissioner of Patents, Washington, D. C."